3,101,317
COAGULATION PROCESS
James E. Starry, Western Springs, Ill., assignor to Nalco Chemical Company, Chicago, Ill., a corporation of Delaware
No Drawing. Filed July 1, 1959, Ser. No. 824,188
5 Claims. (Cl. 210—52)

This invention relates to a new method for coagulating suspended solids from turbid waters using a combination of inorganic coagulants. More specifically it relates to the use of alum in conjunction with alkali metal aluminates in the clarification of turbid waters.

Perhaps the most widely used coagulants for clarifying turbid waters are the well-known inorganic chemicals alum, ferrous sulfate, and ferric sulfate. Of these materials by far the most important is alum.

Alum is used extensively in clarifying raw water supplies of many types. It is predominantly used in the field of municipal water clarification and the clarification of water supplies used in industrial processes. Waters of these types are generally considered to be low turbidity waters insofar as the quantity of suspended solids contained in such waters usually never exceeds more than 1,000 parts per million (expressed as $SiO_2$) Hellige.

Quite frequently it is necessary to use extremely large dosages of alum to clarify low turbidity waters. Serious investigators of the mechanism by which alum and certain iron salts coagulate such water have determined that the alum functions in a dual role insofar as it must first neutralize the charges associated with the surface of the suspended solids, which charges keep these particles in suspension. Once the particle charges have been neutralized, which point may be generically called the isoelectric point, it has been postulated that additional amounts of alum or iron salts are necessary to provide a voluminous, sticky surface on which to absorb the neutralized solids and produce a floc with sufficient density to settle rapidly.

Thus, in some cases, it is necessary to use as much as 50 to 100 parts of alum or iron salts to effectively coagulate a turbid water, with the larger part of the alum or iron salts acting in the function of a binder or a coalescer for the neutralized particles. When such large quantities of iron or alum salts are used to effectively coagulate such waters, undesirable decreases in pH's sometimes occur, and the cost of treatment becomes excessive. It would be a valuable contribution to the art if alum and iron salts could be more effectively utilized in coagulating low turbidity waters. It also would be beneficial if the coagulation efficacies of these coagulants could be increased by adding therewith small but effective dosages of an economical inorganic coagulant.

The invention, in its simplest form, comprises the effective utilization of alum or iron salts as a cogulant by using these materials in a specific way with the well-known inorganic coagulants, alkali metal aluminates.

The invention is practiced by treating waters containing the suspended solids with small incremental dosages of iron salts or alum under coagulating conditions until a dosage is reached whereby floc formation is first evidenced. This particular point of floc formation sets what may be termed as the alum demand for the particular water in question. This type of floc is fine and does not readily settle from the water. At this point of the process, the water is then treated under coagulating conditions with the iron or alum salts in the dosages determined by the above procedures and also with at least 2 parts per million of an alkali metal aluminate, which combination treatment forms a more rapidly settling floc than if alum were used alone.

It is interesting to note, and as will be shown by the experiments subsequently presented, that the amount of alum or iron salts necessary to produce a good quality floc will be far in excess of the quantity necessary to produce the first visible floc discussed above. Thus, for instance, it is quite common to find that, while 20 parts per million alum will produce in some waters a very fine non-settling floc, it may take as much as 40 to 60 additional parts to produce a floc which is satisfactory from a practical clarification standpoint.

In order to be satisfactory for use in conventional water clarification equipment, a floc produced from a low turbidity water, when treated with any coagulant, should have the ability to settle from the water in a period of time of five minutes or less, under conditions of normal jar testing, using 1,000-ml. samples in 1-liter beakers. Flocs which take longer than this to settle would not be considered suitable from the standpoint of effectively utilizing conventional clarification equipment. While the period of time set above is considered as being standard for most of the water condition in industry, it will be noted that in some cases a floc may settle in somewhat longer than 5 minutes. The flocs produced in accordance with the invention, however, are capable of settling in periods of time ranging from 30 seconds to about three minutes, based on jar test observations and results obtained in commercial clarifiers. The floc also is less fragile; hence it is not subject to breaking or flaking such as is the case when alum and iron salts are used alone.

The use of either alum or iron salts in incremental dosages as mentioned above may be more clearly understood insofar as it pertains to the invention by the following hypothetical example: Assuming that the particular water to be treated is a raw river water which contains 50 parts per million of turbidity, the alum demand of this particular water would be determined by setting up a series of jar tests with each container being treated with increasing large dosages of alum in each jar, and the water would then be subjected to a coagulation process which typically would be rapid agitation for 5 minutes and then slower agitation for 15 minutes.

In the case of this hypothetical river water, ten jars might be set up and into each jar amounts of alum would be added in increasing amounts of five parts per million. Thus, each of the ten jars would contain the following dosages in terms of parts per million: 5, 10, 15, 20, 25, 30, 35, 40, 45, and 50.

After conducting the jar tests, it might be observed that no floc forms at a dosage of 15 parts per million alum, while the dosage of 20 parts per million of alum produced the first visible signs of a floc. It is this particular dosage that would be the alum demand for this particular water.

While it has been shown for purposes of illustration that the alum was added in incremental dosages of 5 parts per million, it will be understood that deviations from this amount may be made without departing from the scope of the invention. Thus, the dosages may be increased in units of one part per million, 2 parts per million, 5 parts per million, or 10 parts per million without affecting the end results. When large incremental units of alum or iron salts are used, it may be necessary to go back from the dosage first producing the visible floc, in small units, to determine the minimum quantity to first produce the floc. Thus, if increments of 10 parts per million of alum are used, and it is determined that a small floc forms at 40 parts per million, but no floc is visible at 30 parts per million, subsequent jar tests would be run, using smaller incremental units of alum, to see at what particular dosage between 30 and 40 parts per million first produced formation of a fine floc.

After establishing the alum demand of a specific water, all that is required to practice the invention is to treat the water with this quantity of alum or iron salts and add thereto at least 2 parts per million, and preferably up to 15–25 parts per million, of an alkali metal aluminate. Further routine experimentation may be conducted to determine the optimum quantity of aluminate to use to produce the toughest, most uniform, and most rapidly settling floc that can be produced.

After the alum demand has been determined, and the optimum dosage of the alkali metal aluminate has been established, the alum and iron salts are of course added to the water separately from the aluminate, since precipitation occurs when alum or iron salts are combined with aluminates if solutions of these are mixed together in the same chemical feeding tank. To insure the best results, it is desirable to first feed the alum to the water to be treated and then add the alkali metal aluminates.

The alkali metal aluminates which may be used in the practice of the invention may be drawn from a large number of known aluminate compounds, many of which are commercially available. While many of the alkali metal aluminates, such as sodium, potassium, cesium, and rubidium aluminates, may be used, it is preferable to use a sodium aluminate since this class of aluminates is by far the most economical from a commercial standpoint and gives good results in the practice of the invention. The aluminates may be either in the form of solids or liquids.

The sodium aluminates which give the best results in the invention are the commercial products sold under the trade names Nalco 680, Nalco 614, and Nalco No. 2 liquid.

Nalso 680 is a very pure grade of sodium aluminate which has the following properties and characteristics:

| | |
|---|---|
| Color | White. |
| Odor | None. |
| Max. solubility at 75° F | 80 parts in 100 parts water. |
| Density | 50 lbs./cu. ft. |
| Insoluble | Less than 0.2%. |
| $Na_2O/Al_2O_3$, molecular ratio | 1.15. |
| $Al_2O_3$ | 46.0. |
| $Na_2O$ | 31.0. |
| Fe | 0.01. |
| Ca and Mg | Negative. |
| Si | 0.02. |
| Heavy metals | Negative. |
| As | Do. |

Slightly hygroscopic.

The product Nalco 614, while being generically considered as a sodium aluminate, is more precisely defined as a solid water treatment composition which comprises from 74% to 85% by weight of sodium aluminate. This composition has an $Na_2O$ to $Al_2O_3$ ratio of from 1.11:1 to 1.25:1 and water-insoluble impurities of the type commonly called red mud. These impurities are in a state of subdivision such that at least 80% of the particles are of a colloidal size. In a preferred form, the aluminate compositions of the Nalco 614 type contain 80% to 85% by weight of sodium aluminate, having an $Na_2O$ to $Al_2O_3$ molar ratio of from 1.18:1 to 1.23:1. The red mud is in a state of subdivision, and at least 90% of the red mud particles are not greater than one micron in diameter. A typical analysis of Nalco 614 is presented below:

| | |
|---|---|
| $Na_2O/Al_2O_3$ ratio | 1.2/1.0. |
| $Al_2O_3$ (average) | 51%. |
| $Na_2Al_2O_4$ | 80%–85%. |
| Insolubles | 5%–8%. |
| Density | 80 lb./cu. ft. as manufactured. |

Slightly hygroscopic.

Regardless of the type of sodium aluminate used, it is desirable that the product have a $Na_2O$ to $Al_2O_3$ ratio within the ranges specified for the products Nalco 614 and Nalco 680, although aluminates having higher ratios may also be used.

To more fully understand the invention, the following example is presented:

EVALUATION OF THE INVENTION

To demonstrate the several advantages of the invention, the following jar test results are presented. In each case, the optimum dosage of alum to produce a satisfactory floc had been established by prior jar tests, which amount is marked as the control. This particular dosage and the floc it produced are designated as the standard which is arbitrarily assigned the numerical value 5. Numerical values below 5 indicate poorer results, whereas values above 5 indicate better results.

Each table is divided into an A section and a B section. The A section shows the establishment of the alum demand, and the B section shows the benefits derived when alum or iron salts are used in conjunction with aluminate.

Example 1

In Table I the test water was a river water having a turbidity of 40 parts per million (expressed as $SiO_2$) and a pH of 5.8. In Table II the test water was a river water having a turbidity of 70 parts per million (expressed as $SiO_2$) and a pH of 8.4. In Table III the test water was a river water having a turbidity of 25 parts per million (expressed as $SiO_2$) and a pH of 7.0.

TABLE I–A

| Test number | Alum (p.p.m.) | Floc forms | Test number | Alum (p.p.m.) | Floc forms |
|---|---|---|---|---|---|
| 1 (control) | 25 | Yes. | 6 | 15 | Yes. |
| 2 | 20 | Yes. | 7 | 13 | Yes. |
| 3 | 15 | Yes. | 8 | 11 | No. |
| 4 | 10 | No. | 9 | 9 | No. |
| 5 | 5 | No. | 10 | 7 | No. |

TABLE I–B

| Test number | Alum (p.p.m.) | Nalco 680 (p.p.m.) | Floc size |
|---|---|---|---|
| 1 (control) | 25 | 0 | 5 |
| 2 | 13 | 2 | 6 |
| 3 | 13 | 4 | 8 |
| 4 | 13 | 6 | 8 |
| 5 | 13 | 8 | 8 |

TABLE II–A

| Test number | Alum (p.p.m.) | Floc forms | Test number | Alum (p.p.m.) | Floc forms |
|---|---|---|---|---|---|
| 1 (control) | 42 | Yes. | 6 | 25 | Yes. |
| 2 | 30 | Yes. | 7 | 20 | Yes. |
| 3 | 20 | Yes. | 8 | 15 | Yes. |
| 4 | 10 | No. | 9 | 10 | No. |
| 5 | 5 | No. | 10 | 5 | No. |

TABLE II–B

| Test number | Alum (p.p.m.) | Nalco 680 (p.p.m.) | Floc size |
|---|---|---|---|
| 1 (control) | 42 | 0 | 5 |
| 2 | 15 | 2 | 6 |
| 3 | 15 | 4 | 6 |
| 4 | 15 | 6 | 8 |
| 5 | 15 | 8 | 8 |

TABLE III-A

| Test number | Ferric sulfate (p.p.m.) | Floc forms | Test number | Ferric sulfate (p.p.m.) | Floc forms |
|---|---|---|---|---|---|
| 1 (control) | 45 | Yes. | 6 | 30 | Yes. |
| 2 | 35 | Yes. | 7 | 25 | Yes. |
| 3 | 25 | Yes. | 8 | 20 | No. |
| 4 | 15 | No. | 9 | 15 | No. |
| 5 | 5 | No. | 10 | 10 | No. |

TABLE III-B

| Test number | Ferric sulfate (p.p.m.) | Nalco 680 (p.p.m.) | Floc size |
|---|---|---|---|
| 1 (control) | 45 | 0 | 5 |
| 2 | 25 | 2 | 3 |
| 3 | 25 | 4 | 5 |
| 4 | 25 | 6 | 5 |
| 5 | 25 | 8 | 6 |

In some instances where large quantities of alum are required to effectively coagulate the water, it is common to add small quantities of lime to prevent a decrease in the pH of the starting water and to furnish alkalinity necessary for alum reaction. By using the practices of the invention, it is quite frequently possible to eliminate the addition of such lime treatments and substantially decrease the amounts of alum added to the water to effectively decrease the turbidity of the water. The chief advantages of the invention are believed to be observable from the above description of the examples, and it will be apparent to those skilled in the art that a new method has been provided for treatment of low turbidity in waters which is designed to give optimum results and eliminate the necessity of making numerous trial-and-error experiments to determine optimum dosages of coagulants.

Jar tests as mentioned above are a standard method for testing coagulants. A more detailed description of this test method may be found in the work, Water Quality and Treatment, second edition, The American Water Works Association, Inc. (1951), pages 157–162, and the references cited therein.

The terms "turbidity" and "suspended solids" as used herein describe finely divided suspended solids and colloidally dispersed color bodies, both of which are common in surface waters.

The invention is hereby claimed as follows:

1. The process of clarifying waters which contain suspended solids which comprises the steps of:
    (A) Treating such waters under floc forming conditions with small incremental dosages of an inorganic coagulant from the group consisting of alum and water soluble salts of iron until the minimum dosage is determined for producing a visible fine floc which does not readily settle, and
    (B) Thereafter continuously treating said waters with the minimum dosage of inorganic coagulant determined in step (A) and with at least 2 parts per million of an alkali metal aluminate whereby a dense, rapidly settling floc is formed and,
    (C) Subsequently separating the water so treated from the settled floc.

2. The process of claim 1 where the inorganic coagulant is alum and the alkali metal aluminate is a sodium aluminate.

3. The process of clarifying waters which contain suspended solids which comprises treating such waters under floc-forming conditions with small incremental dosages of alum until a dosage is reached which produces a visible floc and then using this quantity of alum in combination with from 2 to 35 parts per million of sodium aluminate to form a dense, rapidly-settling floc and subsequently removing the water so treated from the settled floc.

4. The process of claim 3 where the sodium aluminate has an $Na_2O$ to $Al_2O_3$ molar ratio within the range of 1.18:1 to 1.23:1.

5. The process of claim 3 where the sodium aluminate is in the form of a solid composition comprising 74% to 85% by weight of sodium aluminate, said composition having an $Na_2O$ to $Al_2O_3$ molar ratio of from 1.11:1 to 1.25.1 and water-insoluble impurities of the type commonly called red mud, said impurities being in a state of subdivision such that at least 90% of the particles are not greater than 1 micron in diameter.

References Cited in the file of this patent

Holmes: Bulletin No. 14–A, National Aluminate Corporation, copyright 1928.

Fair et al.: "Water Supply and Waste-Water Disposal," published by Wiley and Sons, N.Y. (1954), pages 624–625.

"Betz Handbook of Industrial Water Conditions," Betz Laboratories, Inc., Philadelphia, page 10 (received in Patent Office Jan. 31, 1958).

Water Works (periodical), article by Miller, April 1927 volume, pages 150–152.

UNITED STATES PATENT OFFICE
CERTIFICATE OF CORRECTION

Patent No. 3,101,317                                August 20, 1963

James E. Starry

It is hereby certified that error appears in the above numbered patent requiring correction and that the said Letters Patent should read as corrected below.

Column 1, line 55, for "cogulant" read -- coagulant --; column 3, line 33, for "Nalso" read -- Nalco --; column 6, line 31, for "1.25.1" read -- 1.25:1 --.

Signed and sealed this 5th day of May 1964.

(SEAL)
Attest:

ERNEST W. SWIDER                              EDWARD J. BRENNER

Attesting Officer                                  Commissioner of Patents